United States Patent [19]

Stevens

[11] Patent Number: 5,082,276
[45] Date of Patent: Jan. 21, 1992

[54] DISTANCE MEASURING GOLF PUTTING APPARATUS

[76] Inventor: Douglas W. Stevens, P.O. Box 6575, Stateline, Nev. 89449

[21] Appl. No.: 664,600

[22] Filed: Mar. 4, 1991

[51] Int. Cl.$^5$ .......................................... A63B 69/36
[52] U.S. Cl. ........................ 273/162 F; 273/183 D; 273/194 A; 273/162 R; 273/186 A; 364/561; 364/410
[58] Field of Search ............ 364/561, 410, 460, 440, 364/550; 273/32 H, 32 B, 32 R, 34 R, 35 R, 183 R, 183 D, 186 A, 193 R, 194 R, 194 A, 162 R, 162 F, DIG. 21

[56] References Cited

U.S. PATENT DOCUMENTS

| | | | |
|---|---|---|---|
| 3,868,692 | 2/1975 | Woodard et al. | 342/458 |
| 4,005,870 | 2/1977 | Grace et al. | 273/183 R |
| 4,136,394 | 1/1979 | Jones et al. | 364/561 |
| 4,251,077 | 2/1981 | Pelz et al. | 273/194 A X |
| 4,656,476 | 4/1987 | Tavtigian | 340/993 |
| 4,698,781 | 10/1987 | Cockerell, Jr. | 364/561 |
| 4,703,444 | 10/1987 | Storms et al. | 364/561 |
| 4,751,689 | 6/1988 | Kobayashi | 367/127 |
| 4,815,020 | 3/1989 | Cormier | 364/709.11 |
| 4,911,450 | 3/1990 | Rabold | 273/194 A X |
| 4,930,787 | 6/1990 | Nobles, Jr. | 273/194 A X |

FOREIGN PATENT DOCUMENTS

WO8200526 2/1982 PCT Int'l Appl.

Primary Examiner—Parshotam S. Lall
Assistant Examiner—Edward J. Pipala
Attorney, Agent, or Firm—John P. O'Banion

[57] ABSTRACT

A distance measuring golf putting apparatus. Attached to one end of a shaft (12) is a housing (10) adapted for striking a golf ball. Contained within the housing are an ultrasonic transmitter (24) and receiver (30), and related circuitry, for measuring the distance to the hole on a putting green and visually displaying that distance to the golfer. The apparatus is activated by a switch (16) located near the end of the shaft (12) opposite the end to which the housing (10) is attached.

11 Claims, 5 Drawing Sheets

DISTANCE MEASURING GOLF PUTTING APPARATUS

BACKGROUND OF THE INVENTION

1. Field of the Invention

This invention pertains generally to apparatus used while playing the game of golf, and more particularly to a distance measuring golf putting apparatus.

2. Description of the Background Art

Proficiency in the game of golf requires many attributes, one of which is skill in putting to the hole on the green. For years, golfers have attempted to better their games by increasing their proficiency at putting. One way to accomplish that goal has been to estimate or measure the distance from the ball to the hole or pin located on the green. This has been generally accomplished by sight estimation techniques, and more recently by use of distance measuring systems and devices. However, the distance measuring systems and devices heretofore developed have been cumbersome in that they require elaborate transmitting and receiving equipment or require the golfer to carry and use a separate device for measuring distance.

Examples of such systems and devices which have been previously developed include U.S. Pat. No. 3,868,692 issued to Woodard et al. on Feb. 25, 1975, which discloses a hand-held device for measuring the distance between a golfer and a particular green on a golf course by receiving signals from a plurality of transmitter units located throughout the golf course (attached to the flags); U.S. Pat. No. 4,136,394 issued to Jones et al. on Jan. 23, 1979, which discloses a distance measuring system having a base unit mounted at or near the pin on the green and a remote unit carried by the golfer; U.S. Pat. No. 4,698,781 issued to Cockerell, Jr. on Oct. 6, 1987, which discloses a system whereby a golfer can operate a portable interrogation unit and request the distance to a specified location from a central station using triangulation techniques; U.S. Pat. No. 4,703,444 issued to Storms et al. on Oct. 27, 1987, which discloses a system essentially identical to that in U.S. Pat. No. 4,698,781 except that the interrogation unit stores the information instead of requiring use of a central station; U.S. Pat. No. 4,815,020 issued to Cormier on Mar. 21, 1989, which discloses an apparatus and method for determining the remaining distance to a hole by measuring distance travelled and comparing it to the official distance for the hole; and U.S. Pat. No. 4,751,689 issued to Kobayashi on June 14, 1988, which discloses a method of measuring distance to a pin from a point on a golf course by measuring the time difference between a radio-wave transmitted by a portable unit and receipt of an ultrasonic wave from a transmitter located at the pin. U.S. Pat. No. 4,656,476 issued to Tavtigian on Apr. 7, 1987, discloses a warning device using radio waves for indicating the position of a golf cart on a golf course with respect to a restricted area, and which includes a visual display for indicating distance to the restricted area.

Also known are hand-held ultrasonic distance measuring devices for household and construction use, such as those manufactured and sold under the trademarks "Digi-Tape" and "Radio Shack," which can be used to measure distance to a stationary object. Additionally, PCT No. WO 82/00526 discloses a microprocessor based sonic ranging apparatus.

The patents and information disclosed above reflect the state of the art of which the applicant is aware and are tendered with the view toward discharging applicant's acknowledged duty of candor in disclosing information which may be pertinent in the examination of this application. However, an apparatus for golf putting which can measure the distance from the ball to the hole is not disclosed therein, and it is respectfully submitted that none of the foregoing patents and other information disclosed suggests or teaches, either singly or when considered in combination, applicant's claimed invention.

SUMMARY OF THE INVENTION

According to the present invention, a housing containing an ultrasonic transmitter, ultrasonic receiver, power supply, and associated circuitry is attached to one end of a shaft. The other end of the shaft is surrounded by a grip which can be held by a golfer. The housing is constructed and attached to the shaft so as to simulate the size, shape and configuration of the head of a conventional wedge-shaped golf putter, and has a flat front face and a curved back side. Other shapes are suitable provided that they generally conform to the size and shape of the head of a golf putter. A switch is located in proximity to the grip end of the shaft, preferably as a recessed or flush mounted push-button switch in the end of the shaft.

An ultrasonic transducer is located at one end of the housing and a digital readout display is located on the top portion of the housing. To measure the distance to the pin marking the hole on the putting green, the golfer points the ultrasonic transducer toward the pin and presses the push-button switch. An ultrasonic signal emanating from the transducer is thereby transmitted toward the pin and a signal reflected by the pin is received by the transducer. These signals are used to measure the distance to the pin, and the measurement is visually displayed to the golfer.

So that the golfer knows in advance how hard to hit the ball for a measured distance, the golfer makes practice putts at specific distances from the hole and learns how hard to hit the ball at those distances. In actual play the golfer uses knows how hard to hit the ball for a given distance and can interpolate for distances which fall between those measured during the practice putts.

An object of the invention is to provide a golf putter which can be used to measure the distance from the ball to the hole.

Another object of the invention is to provide a golfer with means to determine how hard to hit the ball when putting.

Another object of the invention is to permit a golfer to accurately measure the distance from the ball to the hole on a putting green without resort to a device separate from the golfer's putter.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
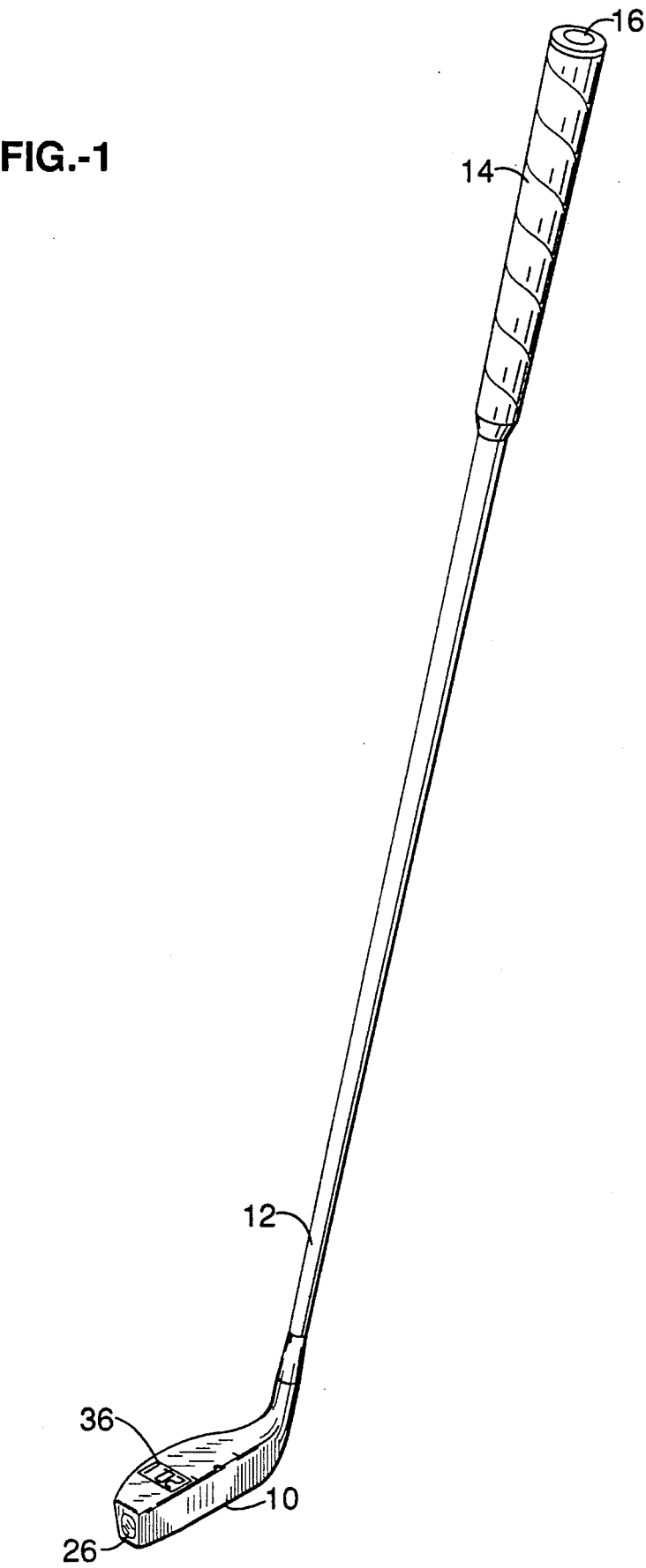
FIG. 1 is a perspective view of apparatus embodying the present invention.
Figure 2:
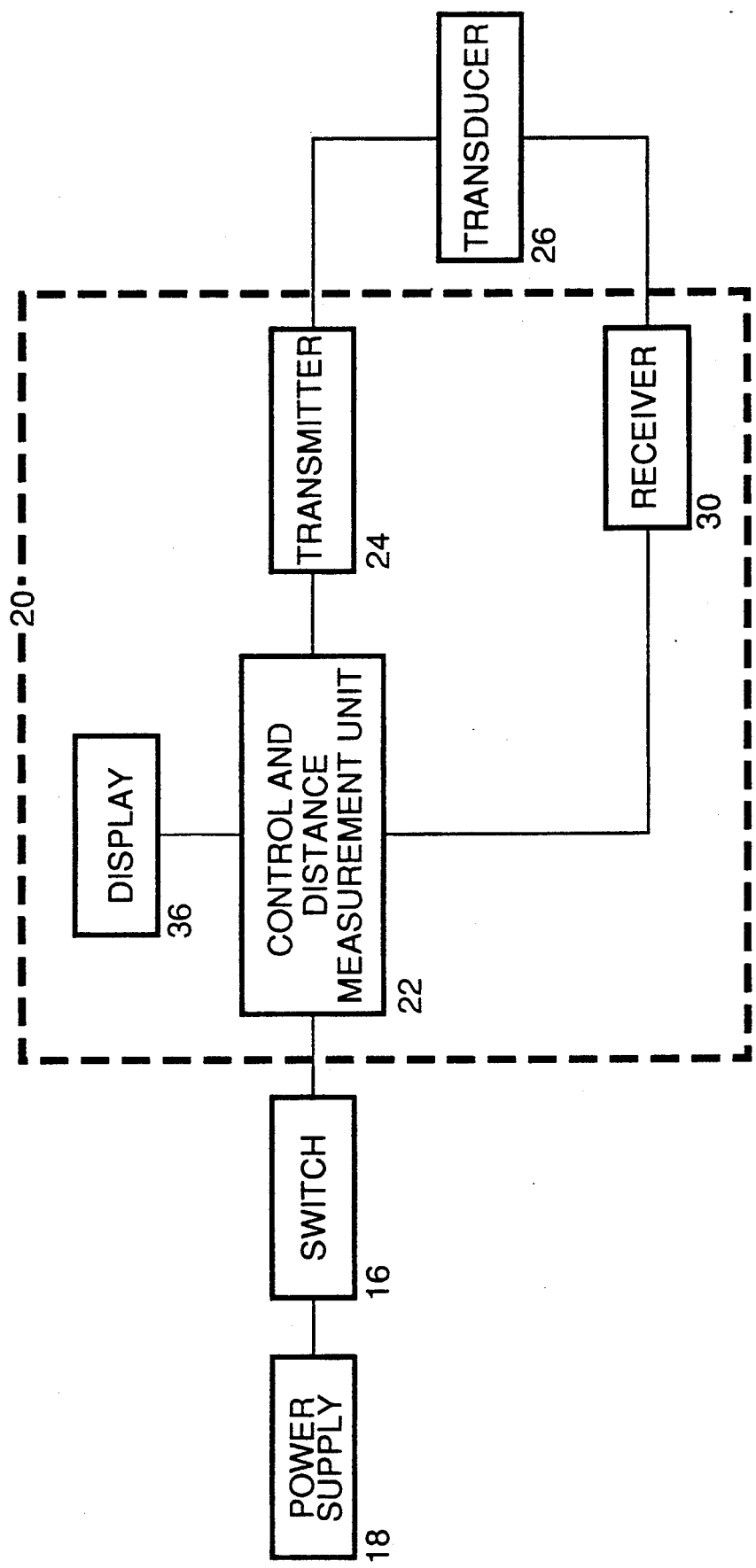
FIG. 2 is a functional block diagram of the distance measuring circuitry employed in the apparatus shown in FIG. 1.

Referring more specifically to the drawings, for illustrative purposes the present invention is generally shown in FIG. 1 and FIG. 2. It will be appreciated that the invention may vary as to the details of its configuration and operation without departing from the basic concepts as disclosed herein.

Referring to FIG. 1, a housing 10 is attached to one end of a shaft 12. Housing 10 is adapted for striking a golf ball by simulating the size and configuration of the head of a wedge-shaped golf club having a flat front face and a curved back side. Other shapes are suitable, but the size, shape and weight of the housing and components contained therein should generally conform to the size, shape and weight of the head of a putter. The other end of shaft 12 is surrounded by a grip 14 which can be held by the golfer. Located in proximity to the end of shaft 12 having grip 14 is push button switch 16 which can be reached by the golfer when holding shaft 12. Preferably, switch 16 is recessed or flush mounted in the end of shaft 12. Housing 10 and shaft 12 are used to hit a golf ball toward the hole on a putting green.

Figure 4:
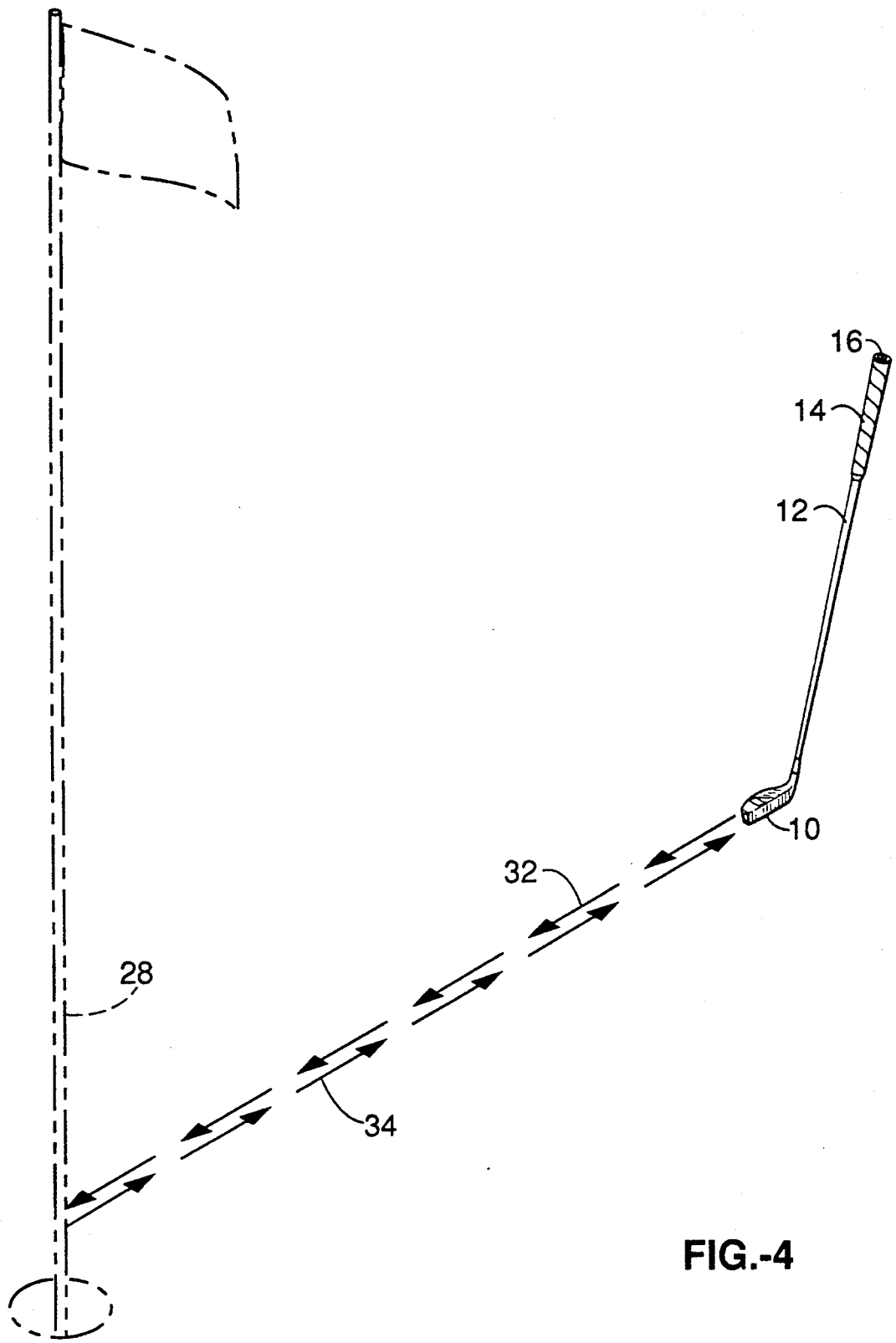
FIG. 4 is a diagrammatic view of placement of the apparatus shown in FIG. 1 for measuring distance from a ball to a hole.

Referring to FIG. 2, contained within housing 10 is power supply 18 which is connected to switch 16. Power supply 18 is preferably a battery so that it can be self contained. Operation of switch 16 activates distance measuring unit 20 by providing power from power supply 18 to distance measuring unit 20. Distance measuring unit 20 is also contained within housing 10. When distance measuring unit 20 is activated, control module 22 causes transmitter 24 to generate an ultrasonic signal which is emitted by transducer 26. An ultrasonic signal in the range of approximately 10,000 to 30,000 Hertz is preferred because of the highly directional features of such a signal. Transducer 26 is a conventional transducer such as a piezo-electric crystal or the like, and produces radiant sound energy in a highly directional pattern. Referring also to FIG. 4, when that signal is transmitted toward a stationary object, such as pin 28 marking the hole on a putting green, that signal is reflected back from the stationary object, detected by transducer 26, and received by receiver 30. Control module 22 converts the received signal into a new signal indicative of the distance between transducer 26 and pin 28 by comparing the time differential between the transmitted signal 32 and the received signal 34. Other signals, such as infrared or radio signals could be employed in order to increase the conversion process since those signals travel faster than the speed of sound. The measured distance is then displayed on display 36 which is a conventional liquid crystal or light emitting diode display. Readout of distance is in feet and tenths of a foot.

Figure 3:
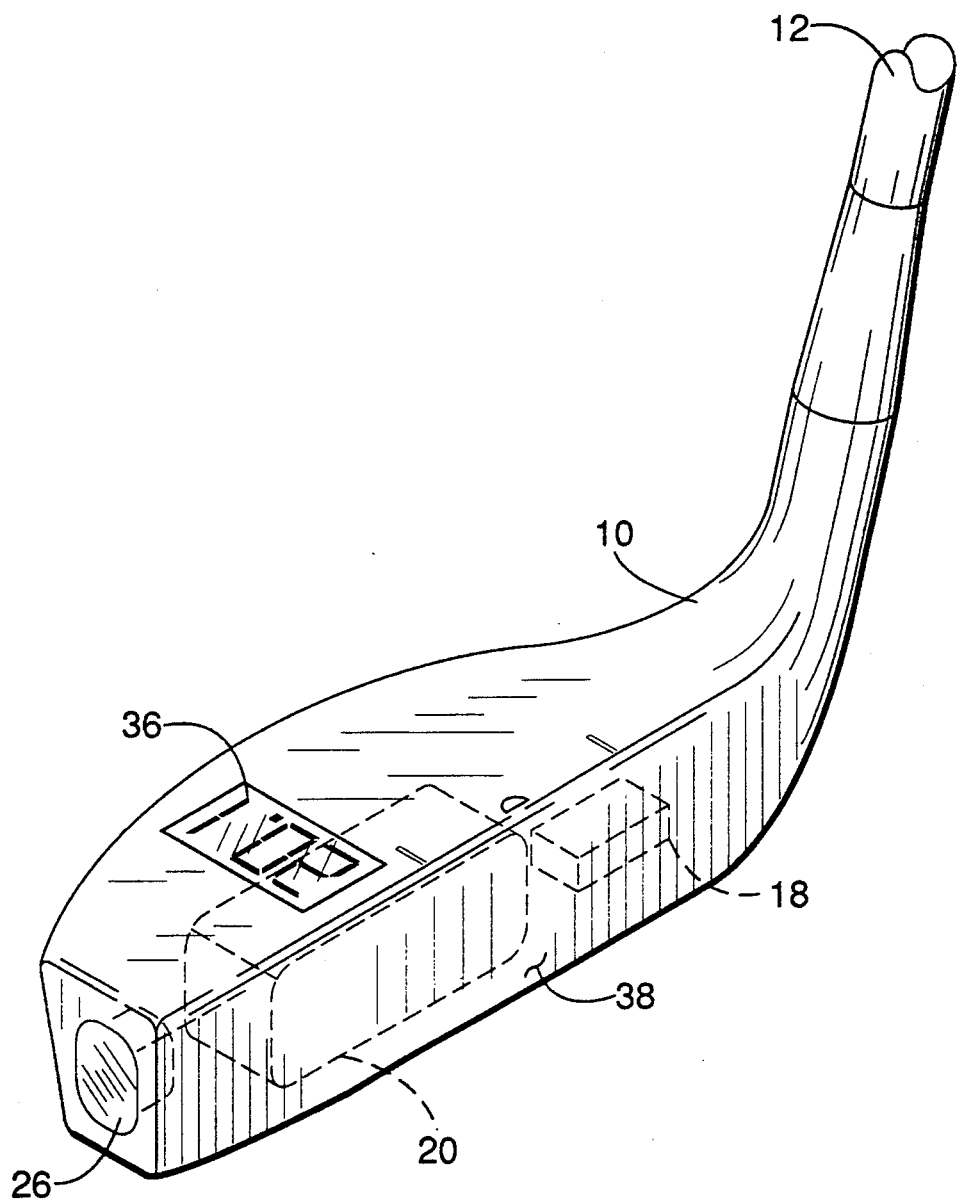
FIG. 3 is a perspective view of the club head portion of the apparatus shown in FIG. 1, and shows the shape and configuration of the preferred embodiment.

Referring to FIG. 3, display 36 is preferably located on the top of housing 10 so that it can be easily viewed by the golfer. Transducer 26 is located at the side or at an edge of housing 10 rather than surface 38 which will strike the ball. This configuration prevent damage to transducer 26 when the ball is hit.

Figure 5:
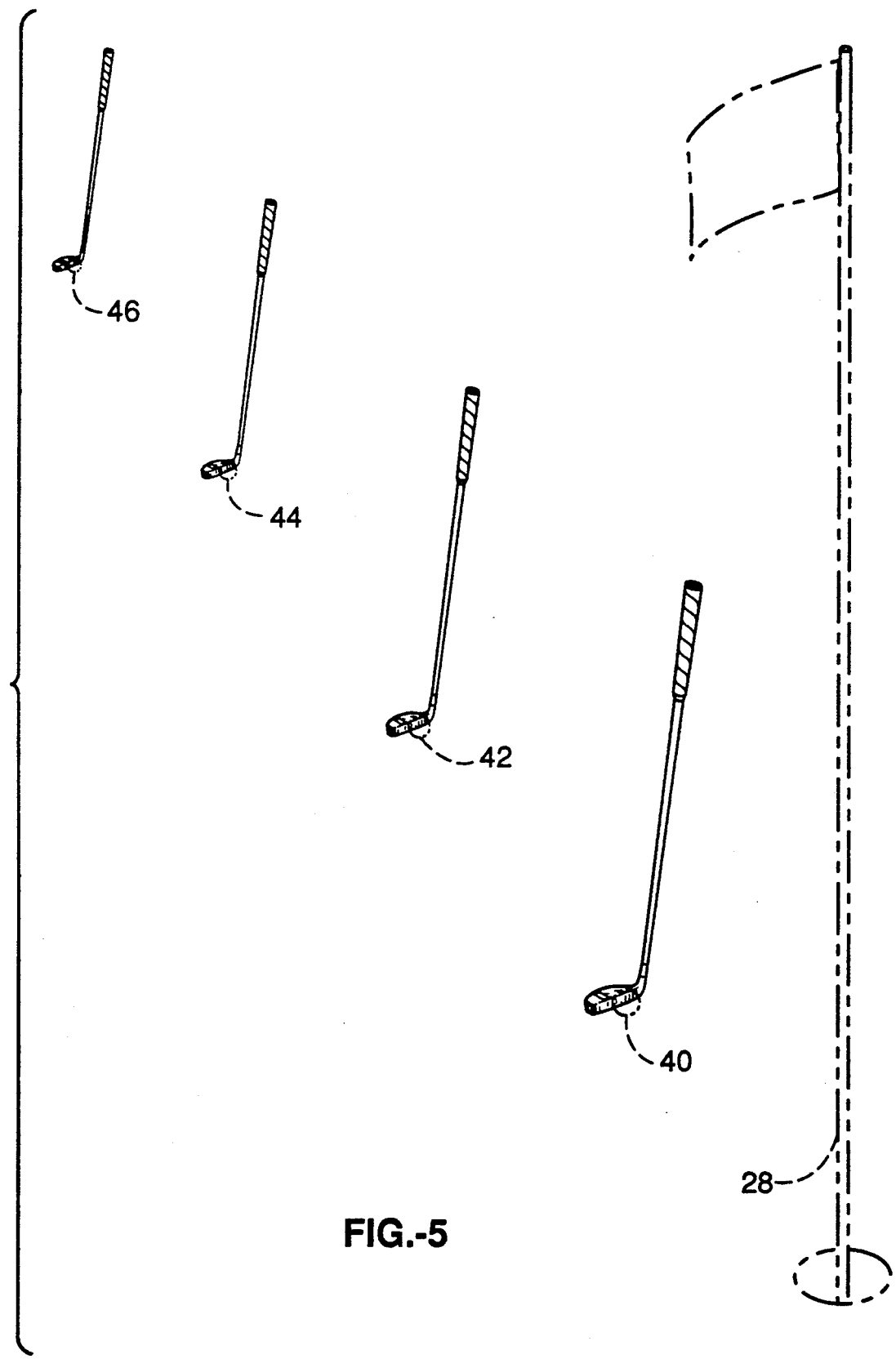
FIG. 5 is a diagrammatic view of the calibration technique used with the apparatus shown in FIG. 1.

Referring to FIG. 1, FIG. 3 and FIG. 4 together, to use the apparatus the golfer points the edge of housing 10 containing transducer 26 toward the pin 28 which marks the hole on the putting green. The golfer then operates switch 16 and reads the distance to the pin on display 36. Knowing the distance to pin 28, the golfer is able to determine how hard to hit the ball based on practice putts previously made. Those practice putts, which represent a method of calibrating the apparatus, are made by the golfer at specific distances from the hole. For example, referring to FIG. 5 the golfer makes a practice putt at positions 40, 42, 44, 46 each spaced five feet apart, with position 40 spaced five feet from pin 28. Then, when in actual play the golfer uses the apparatus to measure the exact distance to the hole, and knows how hard to hit the ball based on those practice putts.

Accordingly, it will be seen that this invention provides a golfer with a single apparatus which can be used for measuring the distance to the hole on a putting green and for putting the ball, based on knowledge of the exact distance to the hole and the required force to hit the ball. Although the description above contains many specificities, these should not be construed as limiting the scope of the invention but as merely providing illustrations of some of the presently preferred embodiments of this invention. Thus the scope of this invention should also be determined by the appended claims and their legal equivalents.

I claim:

1. A distance measuring golf apparatus, comprising:
    (a) a shaft, said shaft having a first end and a second end;
    (b) a housing, said housing attached to said first end of said shaft, said housing adapted for striking a golf ball;
    (c) measuring means for measuring the distance between said housing and a stationary object, said measuring means being contained within said housing; and
    (d) activating means for activating said measuring means.

2. The apparatus recited in claim 1, further comprising power supply means for powering said measuring means.

3. The apparatus recited in claim 2, wherein said activating means comprises a switch, said switch located in proximity to said second end of said shaft, said switch operatively coupled to said power supply means.

4. The apparatus recited in claim 1, wherein said measuring means comprises:
    (a) transmitting means for transmitting a first signal toward said stationary object;
    (b) receiving means for receiving said first signal after being reflected from said stationary object;
    (c) converting means for converting said received first signal into a second signal representing the distance between said club head and said stationary object; and
    (d) displaying means for visually displaying said second signal as the distance between said club head and said stationary object.

5. The apparatus recited in claim 4, wherein said first signal is ultrasonic.

6. The apparatus recited in claim 5, wherein said activating means comprises a switch, said switch located in proximity to said second end of said shaft, said switch connected to said measuring means.

7. The apparatus recited in claim 6, further comprising a power supply means for powering said measuring means, said power supply means connected to said switch.

8. A distance measuring putter for use in the game of golf, comprising:
  (a) a shaft, said shaft having a first end and a second end;
  (b) a club head, said club head attached to said first end of said shaft;
  (c) transmitting means for transmitting a signal toward a stationary object, said transmitting means contained within said club head;
  (d) receiving means for receiving said first signal after being reflected from said stationary object, said receiving means contained within said club head; and
  (e) displaying means for visually displaying said received first signal as the distance between said club head and said stationary object, said displaying means contained within said club head.

9. The apparatus recited in claim 8, wherein said first signal is ultrasonic.

10. The apparatus recited in claim 9, further comprising:
  (a) a switch, said switch located in proximity to said second end of said shaft; and
  (b) power supply means for powering said apparatus, said power supply means connected to said switch.

11. A distance measuring golf putter, comprising:
  (a) a shaft, said shaft having a first end and a second end;
  (b) a club head, said club head attached to said first end of said shaft;
  (c) transmitting means for transmitting an ultrasonic signal toward a stationary object, said transmitting means contained within said club head;
  (d) receiving means for receiving said ultrasonic signal after being reflected from said stationary object, said receiving means contained within said club head;
  (e) converting means for converting said received ultrasonic signal into a second signal representing the distance between said club head and said stationary object;
  (f) displaying means for visually displaying said second signal as the distance between said club head and said stationary object;
  (g) power supply means for supplying power to said apparatus; and
  (h) a switch, said switch connected to said power supply means.

* * * * *